United States Patent
Rieke et al.

(10) Patent No.: US 8,202,569 B2
(45) Date of Patent: Jun. 19, 2012

(54) PROCESS OF MAKING POROUS ELECTRODES

(75) Inventors: Peter C. Rieke, Pasco, WA (US); Silas A. Towne, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 986 days.

(21) Appl. No.: 12/176,720

(22) Filed: Jul. 21, 2008

(65) Prior Publication Data

US 2010/0015327 A1 Jan. 21, 2010

(51) Int. Cl.
*B05D 5/12* (2006.01)
(52) U.S. Cl. ...... 427/115; 427/123; 427/243; 427/383.1
(58) Field of Classification Search .......... 427/115, 427/123, 243, 383.1
See application file for complete search history.

(56) References Cited

U.S. PATENT DOCUMENTS

| | | | |
|---|---|---|---|
| 3,439,306 A * | 4/1969 | Schimmel | 427/123 X |
| 5,720,780 A | 2/1998 | Liu et al. | |
| 6,143,216 A | 11/2000 | Loch et al. | |
| 2003/0082446 A1 | 5/2003 | Chiang et al. | |

FOREIGN PATENT DOCUMENTS

| | | |
|---|---|---|
| WO | WO9944246 A1 | 9/1999 |
| WO | WO0161772 A1 | 8/2001 |

OTHER PUBLICATIONS

Reike, Peter; Viswanathan, Vish; Towne, Silas; Chang, Alex; Chappell, Ellen; Buckley, Bill; Drop-On-Demand Fabrication of Li-Ion Batteries Using Ultra-Dry Inks and Incorporating Nanostructured Architectures; Poster/Presentation; Feb. 7, 2008; 1-4 pps.
PCT International Search Report/Written Opinion, (Nov. 9, 2009).

* cited by examiner

*Primary Examiner* — Leo B Tentoni
(74) *Attorney, Agent, or Firm* — Allan C. Tuan

(57) ABSTRACT

Methods and feedstock compositions for preparing porous electrodes as contained in lithium ion and lithium polymer batteries that comprise an electrolyte composition are described. The methods are characterized by depositing on a substrate a feedstock having a soluble pore former, precipitating at least a portion of the soluble pore former from the feedstock, and dissolving the solid pore former from the electrode using at least a portion or constituent of the electrolyte composition. The feedstock compositions are characterized by a pore former that forms a two-phase system with at least one constituent of the electrolyte composition. The feedstock does not contain materials that are not also substantially contained in the lithium ion battery.

13 Claims, 4 Drawing Sheets

PROCESS OF MAKING POROUS ELECTRODES

STATEMENT REGARDING FEDERALLY SPONSORED RESEARCH OR DEVELOPMENT

This invention was made with United States Government support under contract number W911NF-07-2-0083. The Government has certain rights in this invention.

BACKGROUND

In the field of electrochemical devices, electrode composition, morphology, and/or architecture can have significant influence on device performance. Fabrication processes, which can be overly complex, are also of concern with regard to device quality, facility cost, and/or device cost. In one example of how device performance can be influenced by electrode properties, the presence of water in electrodes, which water can be introduced during fabrication, can significantly reduce the energy density and lifetime of lithium-ion batteries. Furthermore, transport paths can determine battery power and recharge rates making porosity and conductivity important electrode properties. As an example of how porosity affects performance, current methods for production of lithium ion batteries for automotive transportation applications require about 40% porosity in the electrode to facilitate rapid discharge rates and hence high power. Common fabrication processes often utilize pore formers that can be hard to remove, can generate significant waste products, and/or can introduce process steps having high potential to reduce device quality and increase failure rates. Examples of such pore formers include, commonly, N-methylpyrrolidinone (NMP) and, less commonly, dibutylphthalate (DBP). These materials play no active role in performance of the lithium battery and must be extracted from the electrode prior to cell assembly. That extraction adds substantially to the complexity and cost of the fabrication process and can reduce the performance of the electrochemical device. Accordingly, a need exists for methods, compositions, and apparatuses to prepare porous electrodes for electrochemical devices.

SUMMARY

Embodiments of the present invention include methods and compositions for preparing porous electrodes as contained in electrochemical devices. In particular, electrochemical devices can include, but are not limited to, lithium ion batteries, which includes lithium ion polymer batteries, having an electrolyte composition. Preferably, the electrolyte composition is a liquid, gel, or other fluid. The methods are characterized by depositing on a substrate a feedstock comprising a soluble pore former. Deposition of the feedstock on the substrate initiates formation of an electrode. Some time before, during, or after formation of the electrode, the method involves precipitating at least a portion of the soluble pore former from the feedstock. This precipitation causes that portion of the soluble pore former to exist as a solid phase within the electrode. The pore former can later be dissolved from the electrode using at least a portion, or a constituent, of the electrolyte composition. Removal of the pore former from the electrode leaves voids that constitute pores in the electrodes. In some embodiments, precipitation of the soluble pore former can occur by evaporating at least a portion of the feedstock. Alternatively precipitation can occur by altering the temperature of the feedstock. More specifically, the temperature can be decreased. Additional methods for causing precipitation of the soluble pore former can be suitable and are based on the concentration of the soluble pore former in feedstock and on the conditions imposed on the feedstock.

In some embodiments, the soluble pore former forms a two-phase system with at least one constituent of the electrolyte composition. In specific instances the soluble pore former can comprise ethylene carbonate. In such instances the feedstock can further comprise dimethyl carbonate, diethyl carbonate, propylene carbonate, or a combination of these electrolyte constituents. Preferably the feedstock does not contain materials that are not also so substantially contained in the lithium ion battery. While many of the examples and embodiments described herein involve feedstock constituents that perform a function in the lithium ion battery, an active role is not a requirement. In other words, the feedstock constituents, which can include a pore former and the solvent for the pore former, can be inert so long as their presence does not negatively influence the performance of the battery and/or complicate the fabrication.

In preferred embodiments the feedstock is an ink for ink jet printing. Accordingly, the step of depositing the ink on the substrate is accomplished by printing with an ink jet printer on the substrate.

Another aspect of the present invention encompasses a feedstock composition for preparing the porous electrodes. The feedstock composition can be characterized by a pore former that forms a two-phase system with at least one constituent of an electrolyte composition of a lithium ion battery. The feedstock composition should not contain substantially any materials that are not also contained in the lithium ion battery. A specific example of a pore former can include, but is not limited to, ethylene carbonate. In instances where the pore former is ethylene carbonate, the electrolyte composition can comprise dimethyl carbonate, diethyl carbonate, propylene carbonate, a combination of these or other solvents useful as the electrolyte In some embodiments the pore former is also a constituent of the electrolyte composition. Alternatively the pore former can be an inert constituent of the lithium battery. Additional pore formers, which form a two-phase system with at least one constituent of the electrolyte composition of the lithium ion battery, exist and can suitably replace ethylene carbonate. However, in preferred embodiments, the alternative pore formers are not sacrificial pore formers in that they must ultimately be removed and in that they are not substantially contained in the lithium ion battery. Specifically, the feedstock should not contain NMP or DBP as pore formers.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1:
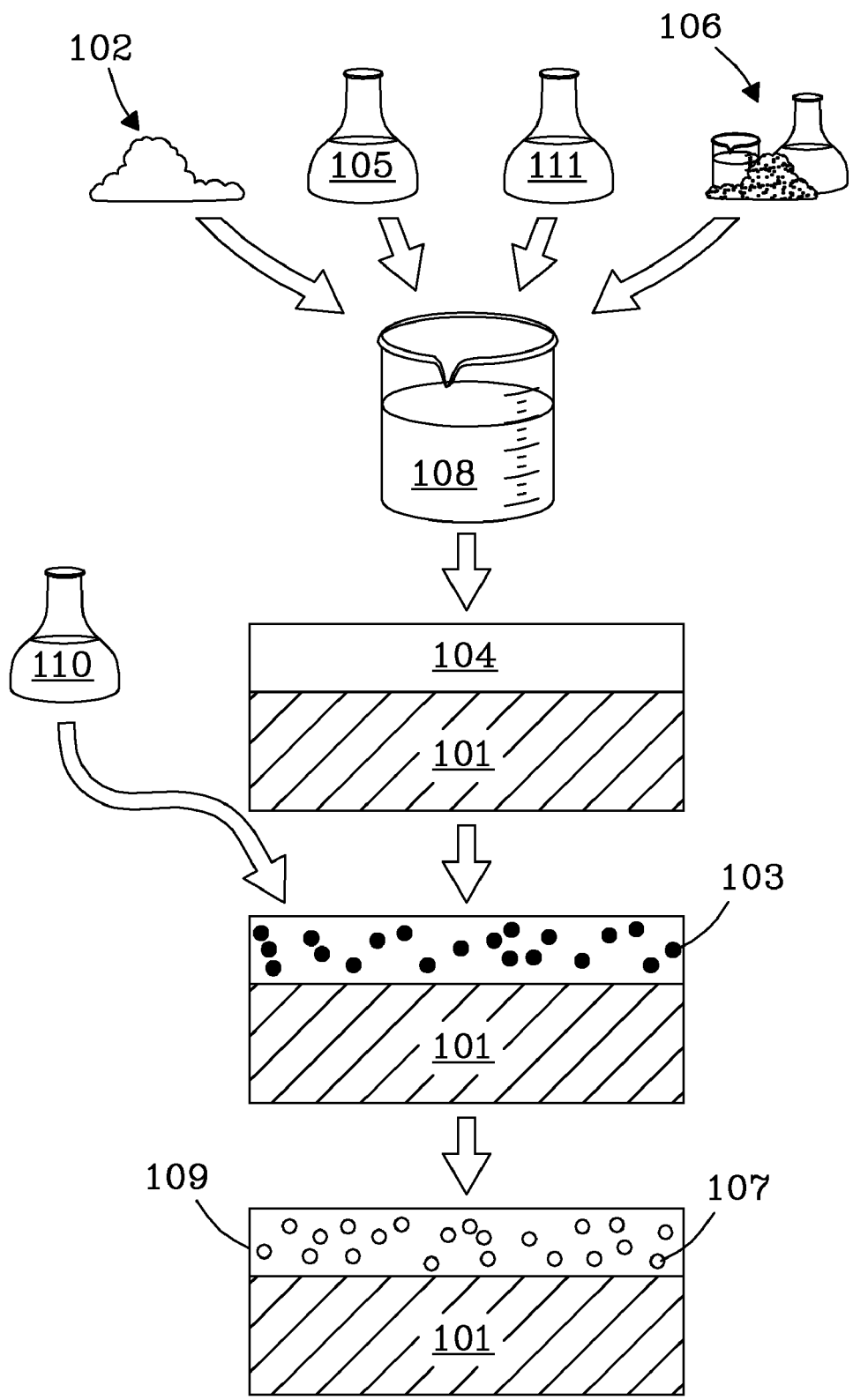
FIG. 1 is an illustration depicting the preparation of porous electrodes as contained in electrochemical devices, according to embodiments of the present invention.
Figure 2:
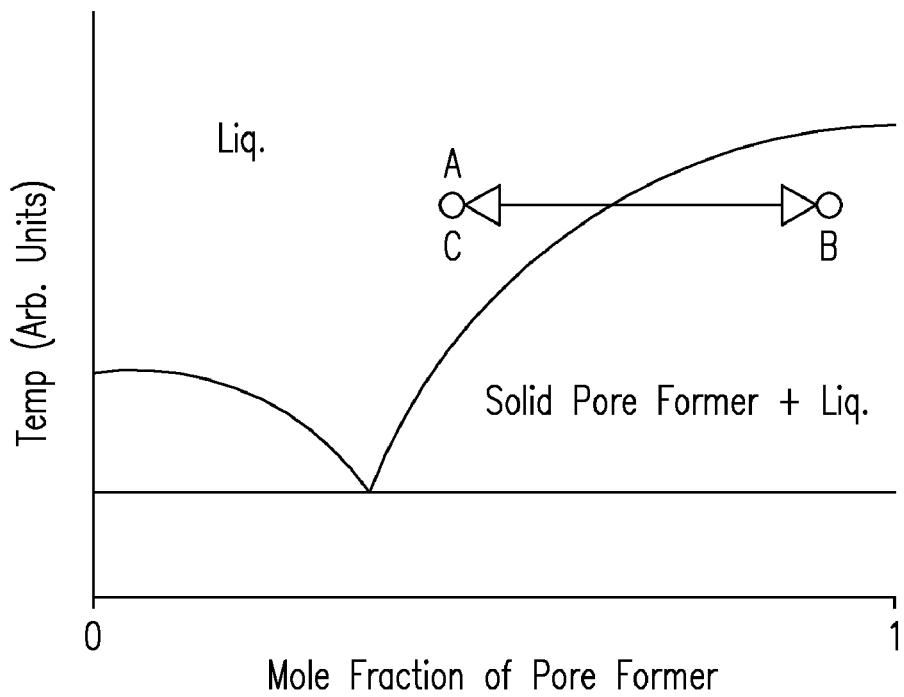
FIG. 2 is a general example of a phase diagram depicting a change between two different phases that can lead to pore formation in an electrode according to embodiments of the present invention.
Figure 3:
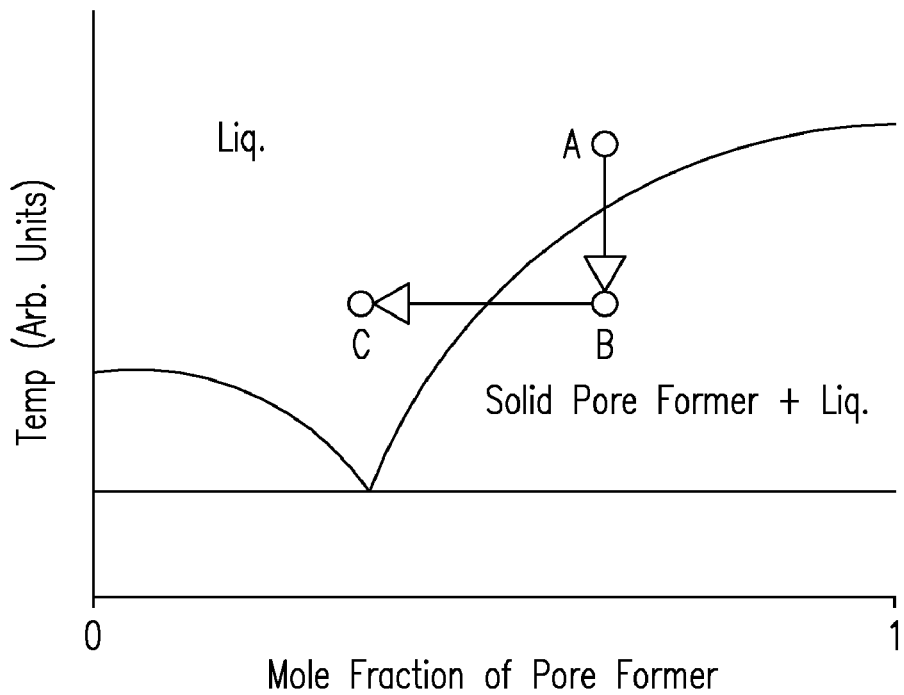
FIG. 3 is a general example of a phase diagram depicting a temperature-based change between different phases that can lead to pore formation in an electrode according to embodiments of the present invention.

FIGS. 1-3 show a variety of embodiments of the present invention. Referring first to FIG. 1, the illustration depicts the preparation of porous electrodes as would be contained in an electrochemical device according to one embodiment of the present invention. In particular, feedstock 108 is a mixture comprising an electrode material 102, a binder 105, a pore former 111, and other feedstock constituents 106. The feedstock can be a suspension, an organic solution, a slurry, and/or other type of liquid-containing mixture. Common electrode materials for lithium ion batteries can include, but are not limited to, manganese oxide, cobalt oxide, and graphite. One exemplary binder includes polyvinyldifluoride. Other binders can include other flourinated polymers such as tetrafluoroethylene or non-flourinated polymers. Other constituents 106 of the feedstock can include a solvent such as propylene carbonate (PC), dimethyl carbonate (DMC), and/or diethyl carbonate (DEC). PC, DMC, and DEC are common components of the electrolyte in lithium ion batteries. Their effectiveness as a solvent in conjunction with the use of ethylene carbonate as a pore former was an unexpected result. While EC, PC, DMC, and DEC can have dual functions, it is not a requirement of the present invention that the solvent or the pore former serve an active role in operation of the electrochemical device. In other words, some embodiments can utilize solvents and/or pore formers that are inert and non-participatory in the functioning of the electrochemical device, so long as their presence does not degrade the performance of the device. Depending on the feedstock composition and/or the technique used for electrodeposition, still other constituents may be added to the feedstock including, but not limited to, surfactants.

In order to form an electrode, the feedstock 108 is deposited 104 on a substrate 101. Suitable deposition techniques can include, but are not limited to, doctor blading, roll coating, spraying, tape casting and, in preferred embodiments, ink-jet printing.

After deposition, and in some cases during deposition, the soluble pore former precipitates into a solid phase 103 within the electrode. In some instances, at least a portion of the soluble pore former precipitates in the feedstock, however such is a less preferred embodiment. The solid pore former can subsequently be removed in solution from within the electrode by the addition of more solvent. It is important to note that all of the feedstock constituents and the solvents will ultimately be contained in the final electrochemical device. For example, in lithium ion batteries, both ethylene carbonate and its solvents (e.g. DMC, DEC, PC) are constituents of the electrolyte that is added prior to sealing the lithium ion battery. Therefore, addition of the electrolyte serves also to dissolve the pore former from the electrodes, thereby leaving pores 107 within the electrodes. The resultant porous electrode 109 is prepared without the use of a sacrificial pore former. As used herein, a sacrificial pore former is one that must ultimately be removed as it is not substantially contained within the electrochemical device.

Referring to FIGS. 2 and 3, exemplary phase diagrams depict two ways of causing phase changes in the soluble pore former. Referring first to FIG. 2, the pore former can go from liquid State A to a solid precipitate in the liquid, State B, and back to a liquid, State C, based on the mole fraction of the pore former in the solvent. In particular, State A can represent the feedstock, which may have a relatively low mole fraction of the pore former. State B can represent the feedstock during or after deposition, when a significant amount of the solvent has evaporated. The evaporation of the solvent can effectively cause the mole fraction of the pore former to increase, causing precipitation to a solid phase. The introduction of additional solvent can then decrease the mole fraction of the pore former and cause a change back into the liquid phase, which is represented by State C. As described elsewhere herein, the introduction of additional solvent can occur during assembly of a lithium ion battery when the electrolyte, which contains a solvent for the pore former, is added.

Alternatively, referring to FIG. 3, the phase change can be caused, at least in part, by changes in temperature. For example, State A can represent the dissolved pore former at a first temperature. By decreasing the temperature, a phase change can be induced to State B, in which solid precipitates exist in the solvent. The solid precipitates can then be dissolved by the addition of more solvent. Again, using the previous example, the introduction of solvent can occur with the addition of an electrolyte containing that solvent.

EXAMPLE

Preparation of Porous Electrodes for Lithium Battery Applications

In the instant example, inks were formed as a feedstock by mixing in the appropriate proportions the solid constituents (e.g., PVDF, flake graphite and ethylene carbonate) in a dimethyl carbonate solvent. Typically the PVDF and graphite wt % were kept constant at a ratio of 10% to 90%, respectively. This was then mixed with ethylene carbonate dissolved in dimethyl carbonate to prepare a solution that contained 0%, 25% 50% and 75% wt % of ethylene carbonate to PVDF+ graphite. In some cases a small quantity of surfactant was added to stabilize the ink. A wt % solids loading of approximately 5% was used for inkjet printed samples. A wt % solids loading of approximately 20 wt % solids loading for doctor bladed samples.

Figure 4:
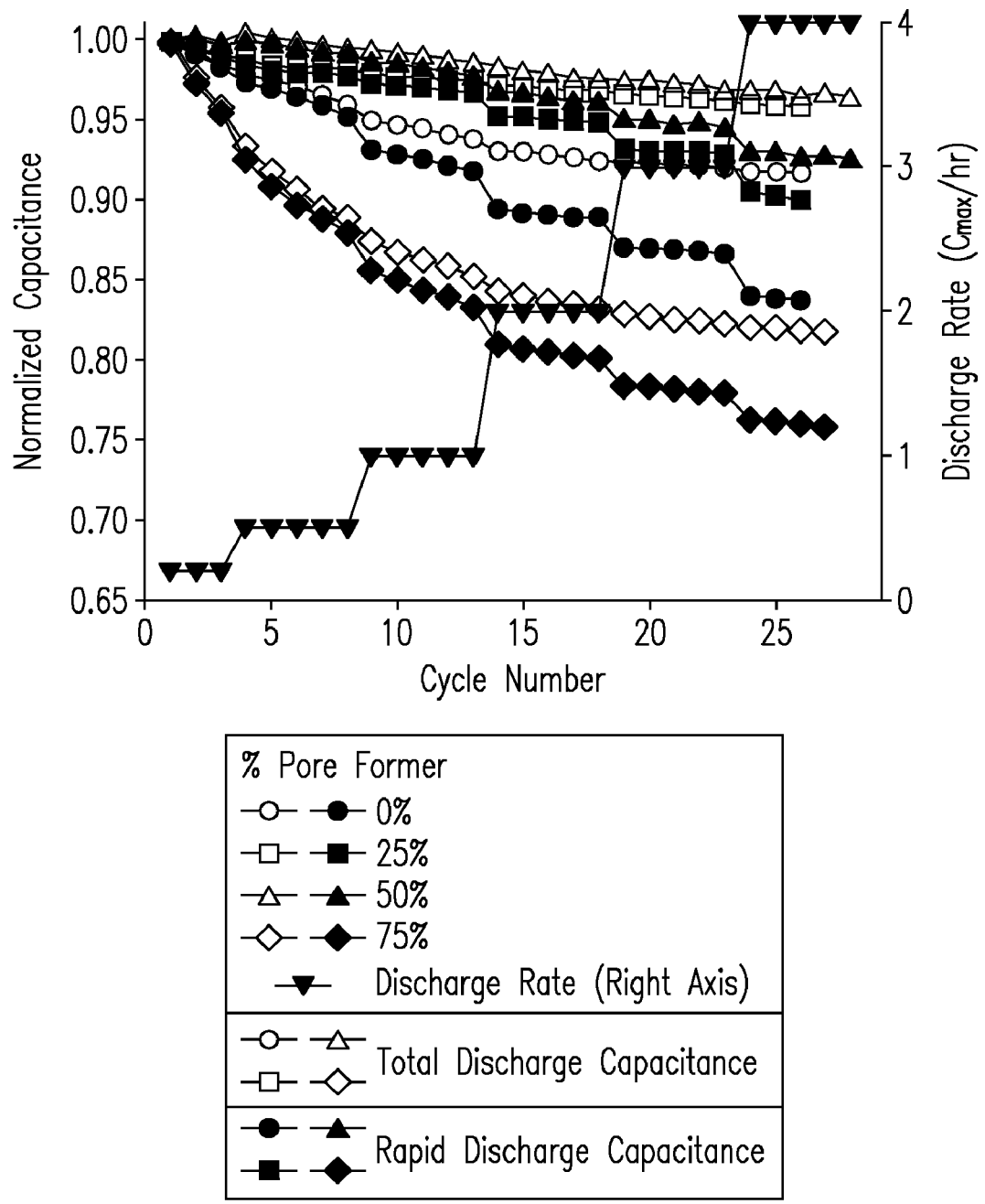
FIG. 4 is a graph of normal capacitance or discharge rate as a function of cycle number for various sample, including a sample prepared with 50% ethylene carbonate according to embodiments of the present invention.

Electrodes were prepared by doctor blading the ink on copper current collectors. The electrode mass was determined by weighing and then assembled in a coin cell without further processing. A solid lithium metal electrode was used as the counter electrode in the coin cell. Just prior to sealing the cell additional electrolyte was added comprising $LiPF_6$ dissolved in an alkyl carbonate solvent. The cells were then tested for Coulombic capacitance at various rapid discharge rates up to 4C until the cell voltage dropped to 5 mV. Discharge was then continued at a fixed cell potential of 5 mV until the current dropped below 5 mA per gram of graphite. As illustrated in FIG. 4, the sample prepared with 50% ethylene carbonate showed the highest Coulombic efficiencies for both the rapid and total capacitances. The rapid discharge capacitance depended upon the percent ethylene carbonate in the order of 75%<0%<25%<50%.

Figure 5A:
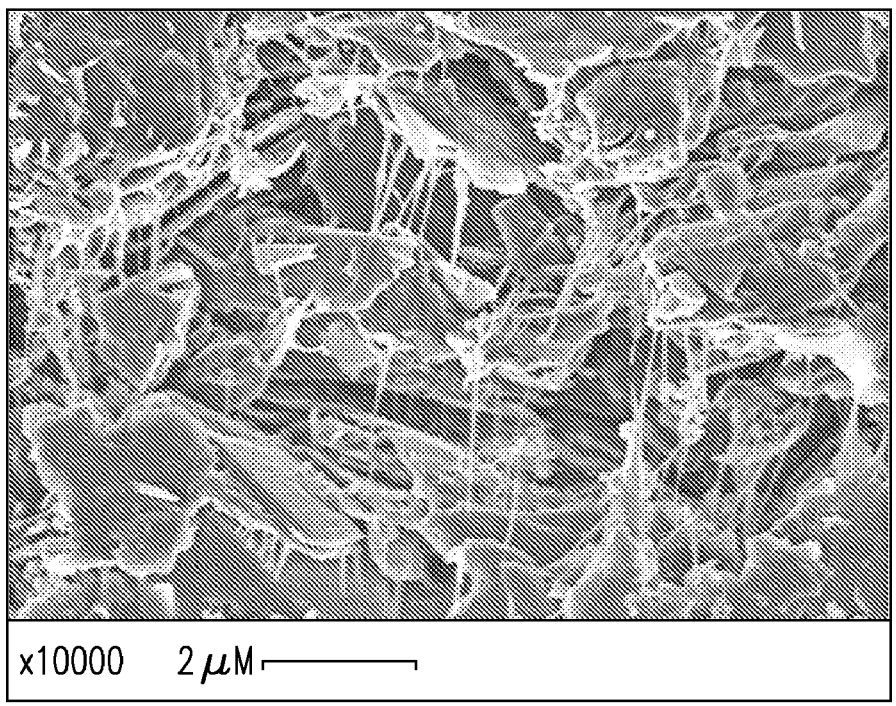
FIGS. 5a and 5b include scanning electron micrographs of samples prepare with 50% and 0% ethylene carbonate, respectively, according to embodiments of the present invention.
Figure 5B:
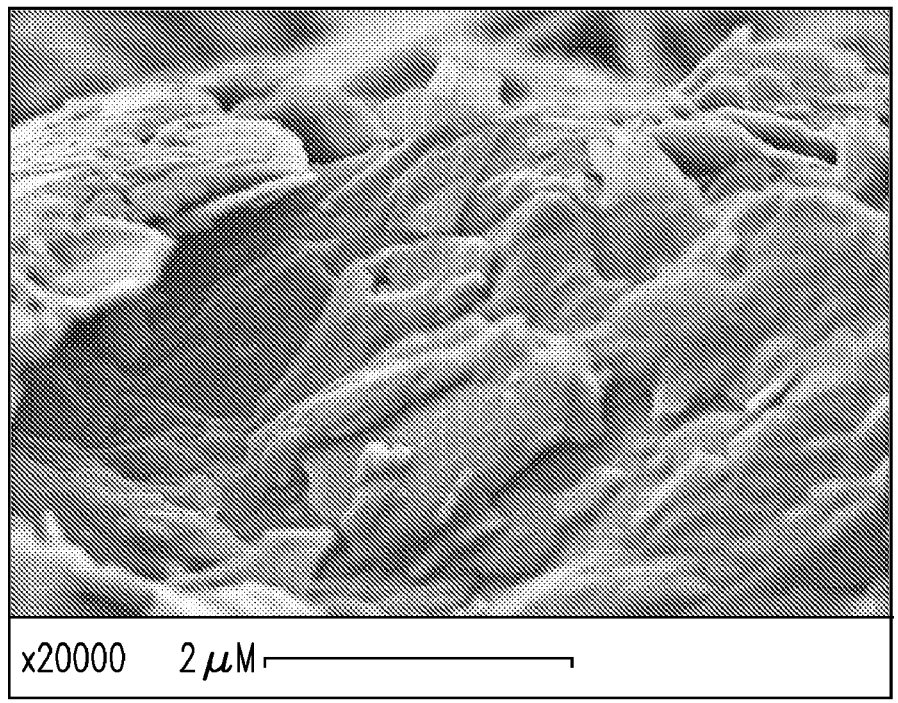

Shown in FIGS. 5(a) and 5(b) are scanning electron micrographs of samples prepared with 50% and 0% ethylene carbonate, respectively. The images show the enhanced porosity afforded by methods described herein. Also evident in FIG. 5(a) are the strands of PVDF between graphite flakes that help maintain the physical integrity of the electrode while obtaining high porosity. These strands are not found in conventionally prepared electrodes where NMP is used as the solvent for PVDF.

These results show that ethylene carbonate can be successfully used to form pores in mechanically stable films, that ethylene carbonate can disrupt the layered graphite structure resulting in reduced pore tortuosity, that ethylene carbonate is easily dissolved from the films without destroying the film structure, that the use of ethylene carbonate can enhance the binding effect of PVDF and may be used to manipulate the electrode structures, that the porosity formed by the ethylene carbonate can enable rapid discharge rates, and that the electrode structure does not require any post deposition processing prior to incorporation into the battery.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method for preparing porous electrodes as contained in lithium-ion batteries that comprise an electrolyte composition, the method characterized by:
   depositing on a substrate a feedstock comprising a soluble pore former, thereby initiating formation of an electrode;
   precipitating at least a portion of the soluble pore former from the feedstock, thereby causing said portion of the soluble pore former to exist in a solid phase within the electrode; and
   dissolving the pore former from the electrode using at least a portion or constituent of the electrolyte composition, thereby leaving voids that form pores in the electrodes.

2. The method of claim 1, wherein said precipitating comprises evaporating at least a portion of the feedstock.

3. The method of claim 1, wherein said precipitating comprises altering the temperature of the feedstock.

4. The method of claim 1, wherein the soluble pore former forms a two-phase system with at least one constituent of the electrolyte composition.

5. The method of claim 1, wherein the soluble pore former comprises ethylene carbonate.

6. The method of claim 5, wherein the feedstock further comprises dimethyl carbonate, diethyl carbonate, propylene carbonate, or combinations thereof.

7. The method of claim 1, wherein the feedstock does not contain a sacrificial pore former.

8. The method of claim 7, wherein the feedstock does not contain N-methyl-2-pyrrollidone (NMP) or dibutylphthalate (DBP) as the sacrificial pore former.

9. The method of claim 1, wherein the electrolyte composition comprises dimethyl carbonate, diethyl carbonate, or combinations thereof.

10. The method of claim 1, wherein the feedstock does not contain materials that are not also substantially contained in the lithium-ion battery.

11. The method of claim 1, wherein the feedstock is an ink for ink jet printing and said forming comprises printing with an ink jet printer.

12. A method for preparing porous electrodes as contained in lithium-ion batteries that comprise an electrolyte composition, the method characterized by:
    depositing on a substrate a feedstock comprising a soluble pore former, thereby initiating formation of an electrode;
    evaporating at least a portion of the feedstock, thereby precipitating at least a portion of the soluble pore former from the feedstock and causing said portion of the soluble pore former to exist in a solid phase within the electrode; and
    dissolving the pore former from the electrode using at least a portion or constituent of the electrolyte composition, the soluble pore former forming a two-phase system with at least one constituent of the electrolyte composition, thereby leaving voids that form pores in the electrodes.

13. A method for preparing porous electrodes as contained in lithium-ion batteries that comprise an electrolyte composition, the method characterized by:
    depositing on a substrate a feedstock comprising a soluble pore former, thereby initiating formation of an electrode;
    altering the temperature of the feedstock, thereby precipitating at least a portion of the soluble pore former from the feedstock and causing said portion of the soluble pore former to exist in a solid phase within the electrode; and
    dissolving the pore former from the electrode using at least a portion or constituent of the electrolyte composition, the soluble pore former forming a two-phase system with at least one constituent of the electrolyte composition, thereby leaving voids that form pores in the electrodes.

\* \* \* \* \*